(12) United States Patent
Tsai (10) Patent No.: US 7,937,805 B2
(45) Date of Patent: May 10, 2011

(54) CASTOR THAT IS BRAKED SOLIDLY AND STABLY WITHOUT PRODUCING VIBRATION

(76) Inventor: Po-Chuan Tsai, Tainan Hsien (TW)

( * ) Notice: Subject to any disclaimer, the term of this patent is extended or adjusted under 35 U.S.C. 154(b) by 434 days.

(21) Appl. No.: 12/142,100

(22) Filed: Jun. 19, 2008

(65) Prior Publication Data

US 2009/0313787 A1    Dec. 24, 2009

(51) Int. Cl.
*B60B 33/00*    (2006.01)
(52) U.S. Cl. .................. 16/47; 16/35 D; 16/35 R
(58) Field of Classification Search ............ 16/29, 35 R, 16/35 D, 47; 188/1.12, 82.1, 84; 292/1
See application file for complete search history.

(56) References Cited

U.S. PATENT DOCUMENTS

| 4,333,207 | A | * | 6/1982 | Atwood | 16/35 R |
| 4,941,552 | A | * | 7/1990 | Screen | 188/1.12 |
| 5,172,451 | A | * | 12/1992 | Chiu | 16/35 R |
| 5,368,133 | A | * | 11/1994 | Yang | 188/1.12 |
| 5,371,921 | A | * | 12/1994 | Roe | 16/35 R |
| 5,371,922 | A | * | 12/1994 | Chern et al. | 16/47 |
| 5,632,360 | A | * | 5/1997 | Melara | 188/1.12 |
| 6,360,851 | B1 | * | 3/2002 | Yang | 188/1.12 |
| 6,662,404 | B1 | * | 12/2003 | Stroh et al. | 16/35 R |
| 6,748,623 | B1 | * | 6/2004 | Tsai | 16/47 |
| 2008/0005868 | A1 | * | 1/2008 | Chou | 16/35 R |
| 2009/0083938 | A1 | * | 4/2009 | Lin | 16/47 |
| 2009/0113671 | A1 | * | 5/2009 | Chu | 16/35 R |

* cited by examiner

*Primary Examiner* — Shane Bomar
*Assistant Examiner* — Roberta Delisle
(74) *Attorney, Agent, or Firm* — Alan Kamrath; Kamrath & Associates PA (57) ABSTRACT

A castor includes a castor body, two rollers rotatably mounted on the castor body and each having an annular toothed locking section, a locking member movably mounted on the castor body and having two locking flanges each having a toothed engaging portion, and a brake handle pivotally mounted on the castor body to drive the toothed engaging portion of each of the locking flanges of the locking member to engage the toothed locking section of the respective roller. Thus, when the brake handle is pressed to stop rotation of the rollers, the resting face of the pivot base abuts the support rib of the castor body so that the brake handle is operated smoothly and stably without producing vibration during operation of the brake handle, thereby enhancing the braking effect of the castor.

11 Claims, 7 Drawing Sheets

CASTOR THAT IS BRAKED SOLIDLY AND STABLY WITHOUT PRODUCING VIBRATION

BACKGROUND OF THE INVENTION

1. Field of the Invention

The present invention relates to a castor and, more particularly, to a castor for a chair and the like.

2. Description of the Related Art

Figure 7:
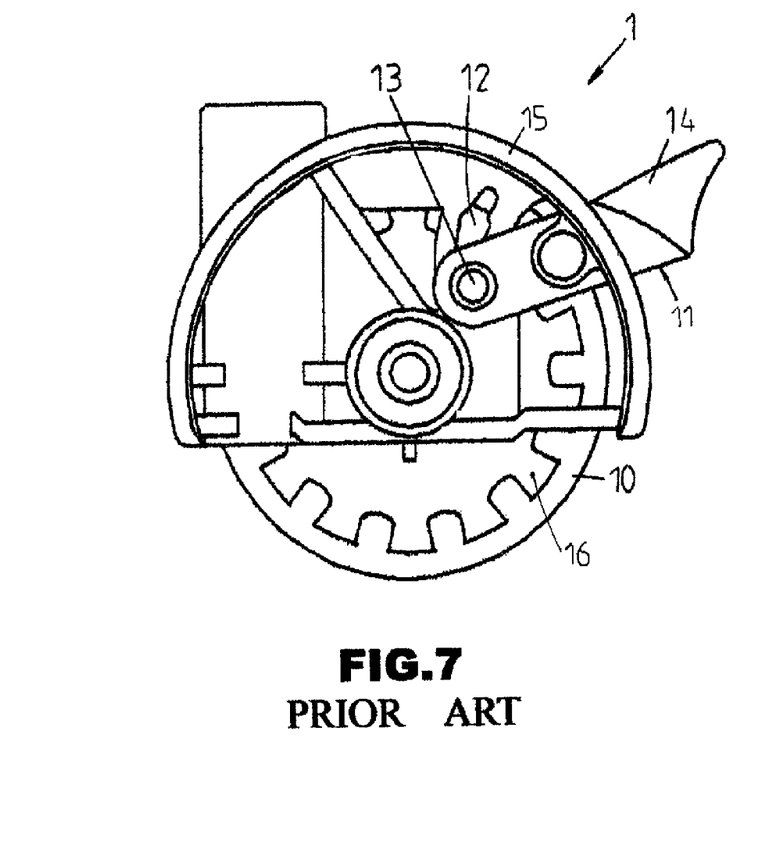
FIG. 7 is a side broken view of a conventional castor in accordance with the prior art.
Figure 8:
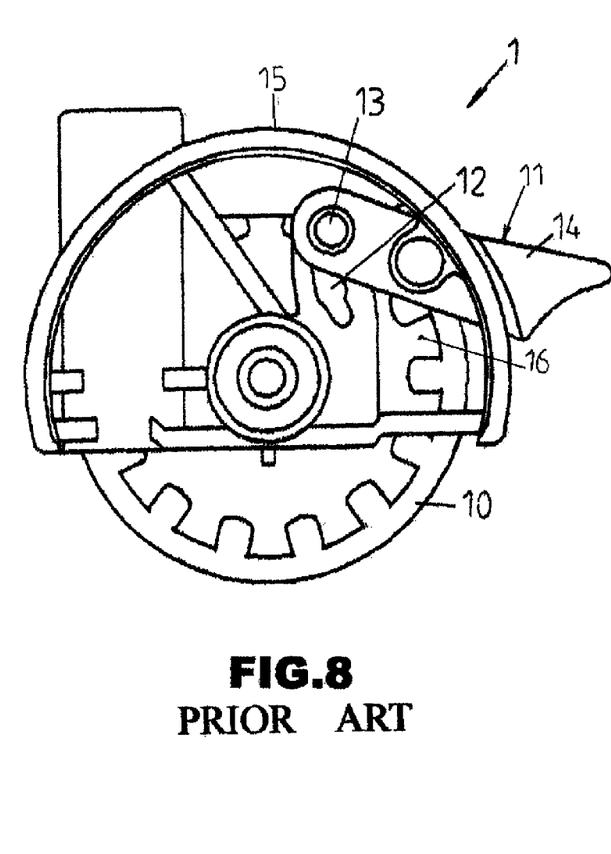
FIG. 8 is a schematic operational view of the conventional castor as shown in FIG. 7.

A conventional castor 1 in accordance with the prior art shown in FIGS. 7 and 8 comprises a castor body 15, two rollers 10 rotatably mounted on two opposite sides of the castor body 15 and each having an inner wall provided with a plurality of locking grooves 16, and a brake handle 11 pivotally mounted on the castor body 15 and having a first end provided with a locking rod 13 that is movable relative to the two rollers 10 and a second end provided with a drive portion 14. The castor body 15 is provided with a guide slot 12 to guide movement of the locking rod 13 of the brake handle 11.

Thus, when the drive portion 14 of the brake handle 11 is pressed downward as shown in FIG. 8, the brake handle 11 is pivoted relative to the castor body 15 to drive the locking rod 13 to move in the guide slot 12 of the castor body 15 so that the locking rod 13 of the brake handle 11 is extended into and locked in one of the locking grooves 16 of each of the two rollers 10 to lock each of the two rollers 10 onto the castor body 15 so as to lock the castor 1.

BRIEF SUMMARY OF THE INVENTION

In accordance with the present invention, there is provided a castor, comprising a castor body, two rollers rotatably mounted on two opposite sides of the castor body and each having an inner wall provided with an annular toothed locking section, a locking member movably mounted on the castor body and having a first end provided with two opposite locking flanges each having a toothed engaging portion facing the toothed locking section of a respective one of the two rollers, and a brake handle pivotally mounted on the castor body and connected with the locking member to drive the toothed engaging portion of each of the two locking flanges of the locking member to engage the toothed locking section of the respective roller.

The primary objective of the present invention is to provide a castor that is braked solidly and stably without producing vibration.

Another objective of the present invention is to provide a castor, wherein when the press portion of the brake handle is pressed to stop rotation of the two rollers and to brake the castor, the second resting face of the pivot base abuts the support rib of the castor body so that the brake handle is operated smoothly, exactly and stably without producing vibration during operation of the brake handle, thereby enhancing the braking effect of the castor.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a castor 2 in accordance with the preferred embodiment of the present invention comprises a castor body 20, two rollers 22 rotatably mounted on two opposite sides of the castor body 20 by a mandrel 21 and each having an inner wall provided with an annular toothed locking section 220, a locking member 23 movably mounted on the castor body 20 and having a first end provided with two opposite locking flanges 231 each having a toothed engaging portion 232 facing the toothed locking section 220 of a respective one of the two rollers 22, and a brake handle 24 pivotally mounted on the castor body 20 and connected with the locking member 23 to drive the toothed engaging portion 232 of each of the two locking flanges 231 of the locking member 23 to engage the toothed locking section 220 of the respective roller 22.

The castor body 20 has a central portion provided with a shaft hole 201 to allow passage of the mandrel 21. The castor body 20 has an end provided with a receiving hole 202 to receive the locking member 23. The castor body 20 has a bottom provided with a protruding support rib 204 which has a substantially arcuate shape. The castor body 20 is provided with a pin hole 203 located between the receiving hole 202 and the support rib 204.

The brake handle 24 has a first side provided with a pivot base 241 pivotally mounted on the castor body 20 and a second side provided with a press portion 240 to drive the pivot base 241 to pivot relative to the castor body 20. The pivot base 241 of the brake handle 24 has a substantially U-shaped cross-sectional profile.

The pivot base 241 of the brake handle 24 has two opposite sidewalls each having a first end provided with a drive portion 245 abutting a second end of the locking member 23 to drive and move the locking member 23 relative to the two rollers 22 and to drive and move the toothed engaging portion 232 of each of the two locking flanges 231 of the locking member 23 relative to the toothed locking section 220 of the respective roller 22.

Each of the two opposite sidewalls of the pivot base 241 of the brake handle 24 has a second end provided with a first resting face 242 and a second resting face 243. The first resting face 242 of the pivot base 241 has a substantially arcuate shape and is movable to abut the support rib 204 of the castor body 20 when the toothed engaging portion 232 of each of the two locking flanges 231 of the locking member 23 is disengaged from the toothed locking section 220 of the respective roller 22, so that each of the two rollers 22 is rotatable relative to the castor body 20. The second resting face 243 of the pivot base 241 has a substantially arcuate shape and is movable to abut the support rib 204 of the castor body 20 when the toothed engaging portion 232 of each of the two locking flanges 231 of the locking member 23 engages the toothed locking section 220 of the respective roller 22, so that each of the two rollers 22 is locked onto the castor body 20. The second resting face 243 of the pivot base 241 is located beside and connected to the first resting face 242, and the first resting face 242 of the pivot base 241 is located between the second resting face 243 and the drive portion 245.

Each of the two opposite sidewalls of the pivot base 241 of the brake handle 24 has a mediate portion provided with a pivot hole 244. The pivot hole 244 of the pivot base 241 is located between the drive portion 245, the first resting face 242 and the second resting face 243. The castor 2 further comprises a pivot pin 25 extending through the pivot hole 244 of the pivot base 241 and the pin hole 203 of the castor body 20 so that the pivot base 241 of the brake handle 24 is pivotally mounted on the castor body 20.

The two locking flanges 231 of the locking member 23 protrude outwardly from two opposite sides of the receiving hole 202 of the castor body 20 and extend into the inner wall of each of the two rollers 22 respectively. The second end of the locking member 23 has a bottom provided with a limit groove 230 to receive and limit the drive portion 245 of the brake handle 24 so that the drive portion 245 of the brake handle 24 is movable and rotatable in the limit groove 230 of the locking member 23 to drive and move the locking member 23.

Figure 1:
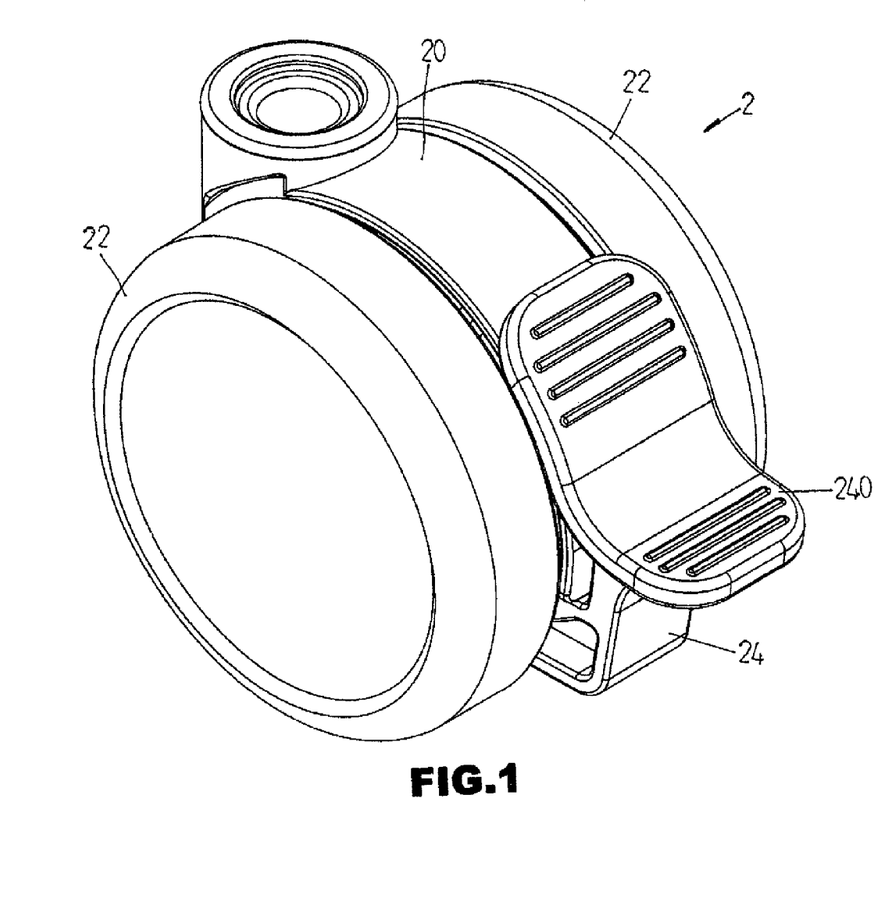
FIG. 1 is a perspective view of a castor in accordance with the preferred embodiment of the present invention.
Figure 2:
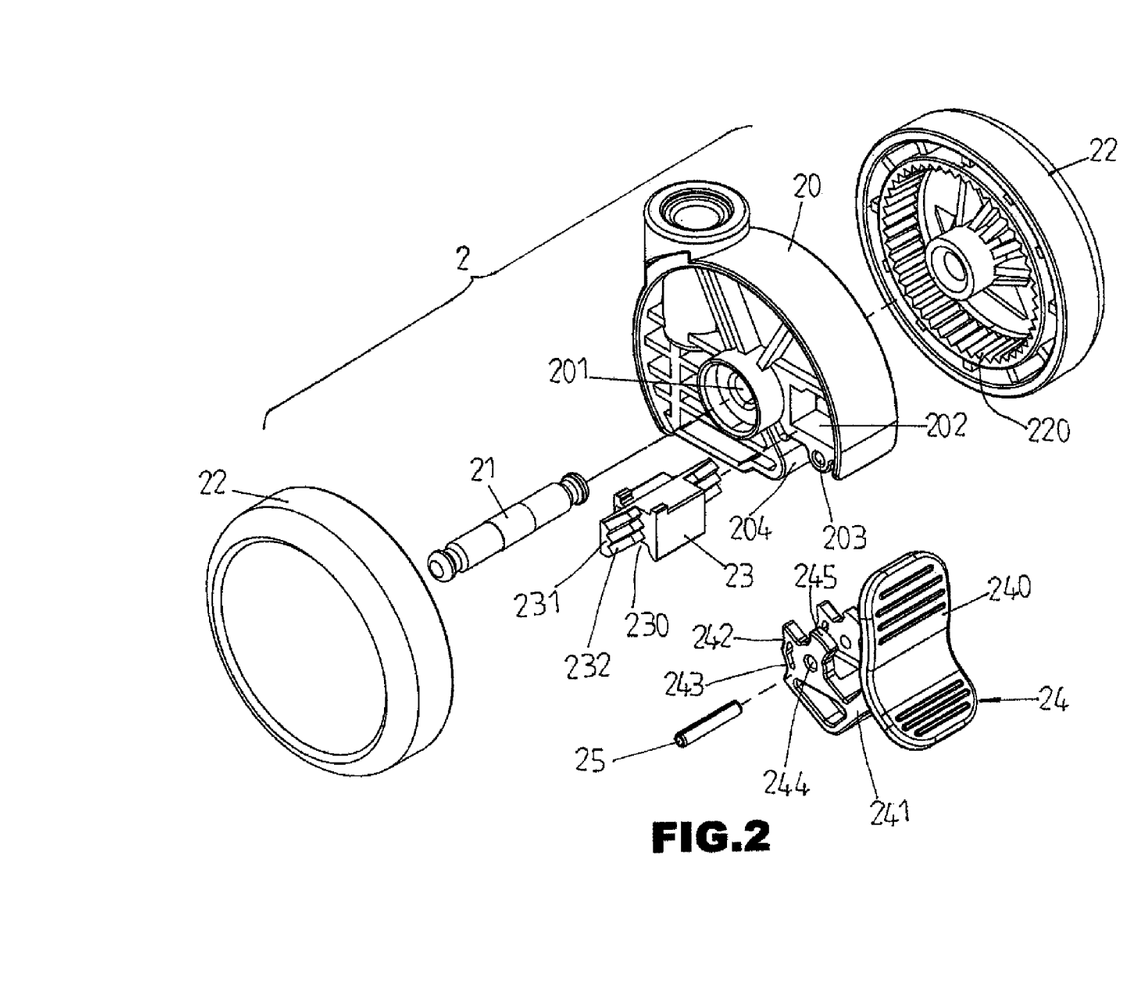
FIG. 2 is an exploded perspective view of the castor as shown in FIG. 1.
Figure 3:
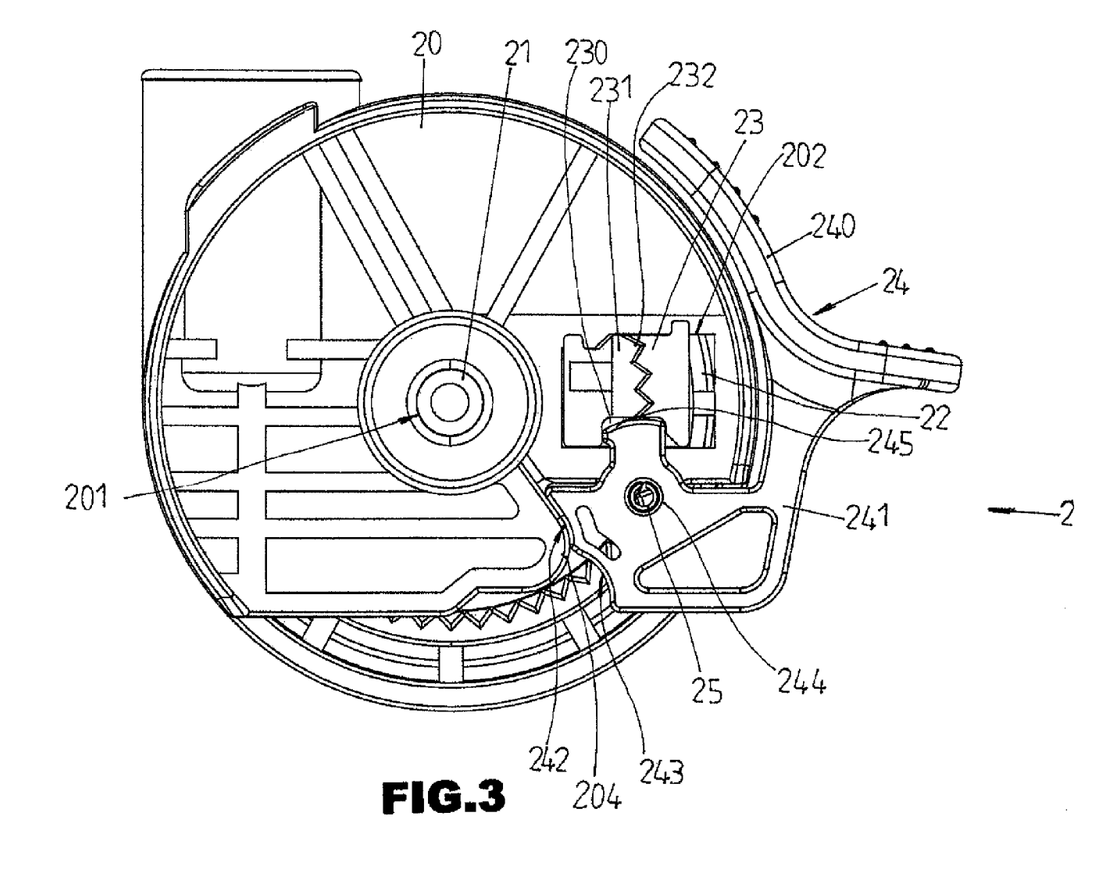
FIG. 3 is a side cross-sectional view of the castor as shown in FIG. 1.
Figure 4:
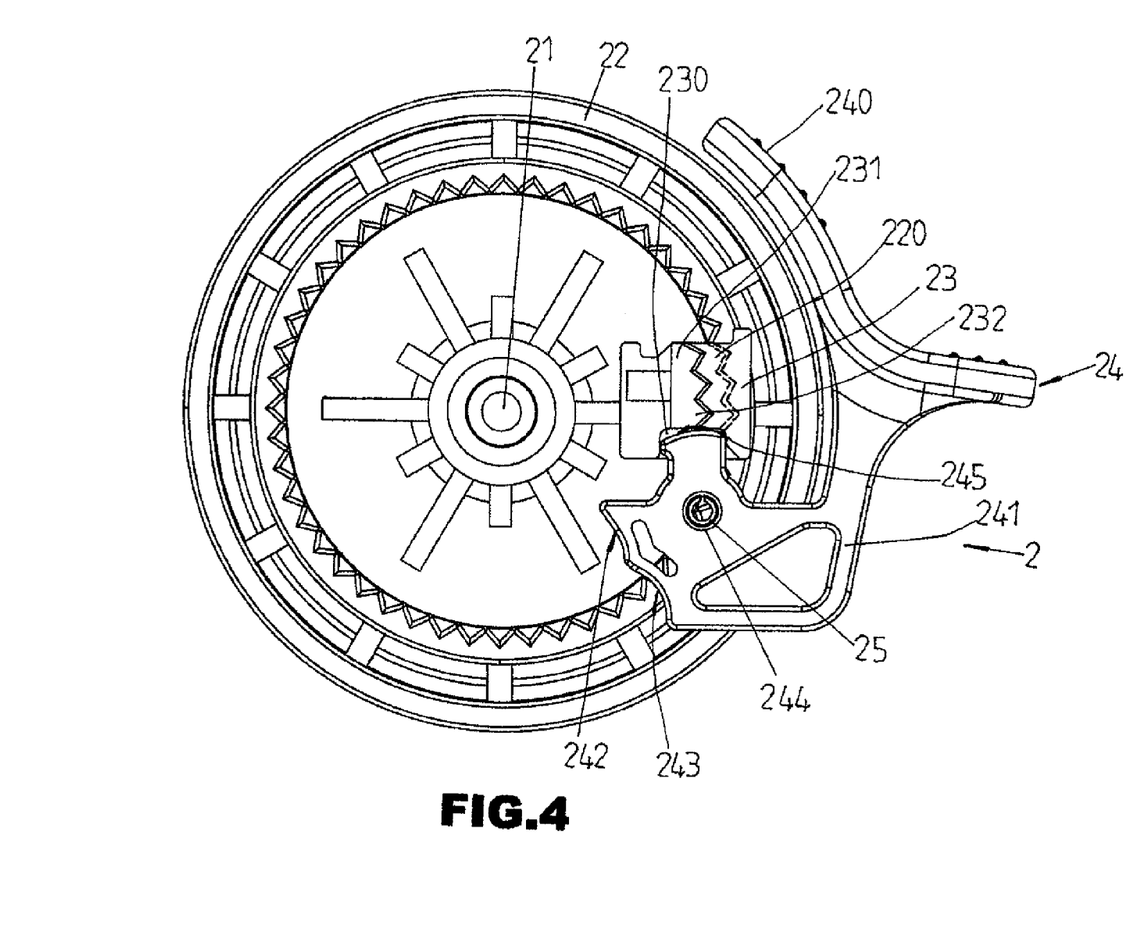
FIG. 4 is another side cross-sectional view of the castor as shown in FIG. 1.

In operation, referring to FIGS. 3-6 with reference to FIGS. 1 and 2, when the first resting face 242 of the pivot base 241 is movable to abut the support rib 204 of the castor body 20 as shown in FIG. 3, the toothed engaging portion 232 of each of the two locking flanges 231 of the locking member 23 is disengaged from the toothed locking section 220 of the respective roller 22 as shown in FIG. 4, so that each of the two rollers 22 is rotatable relative to the castor body 20.

Figure 5:
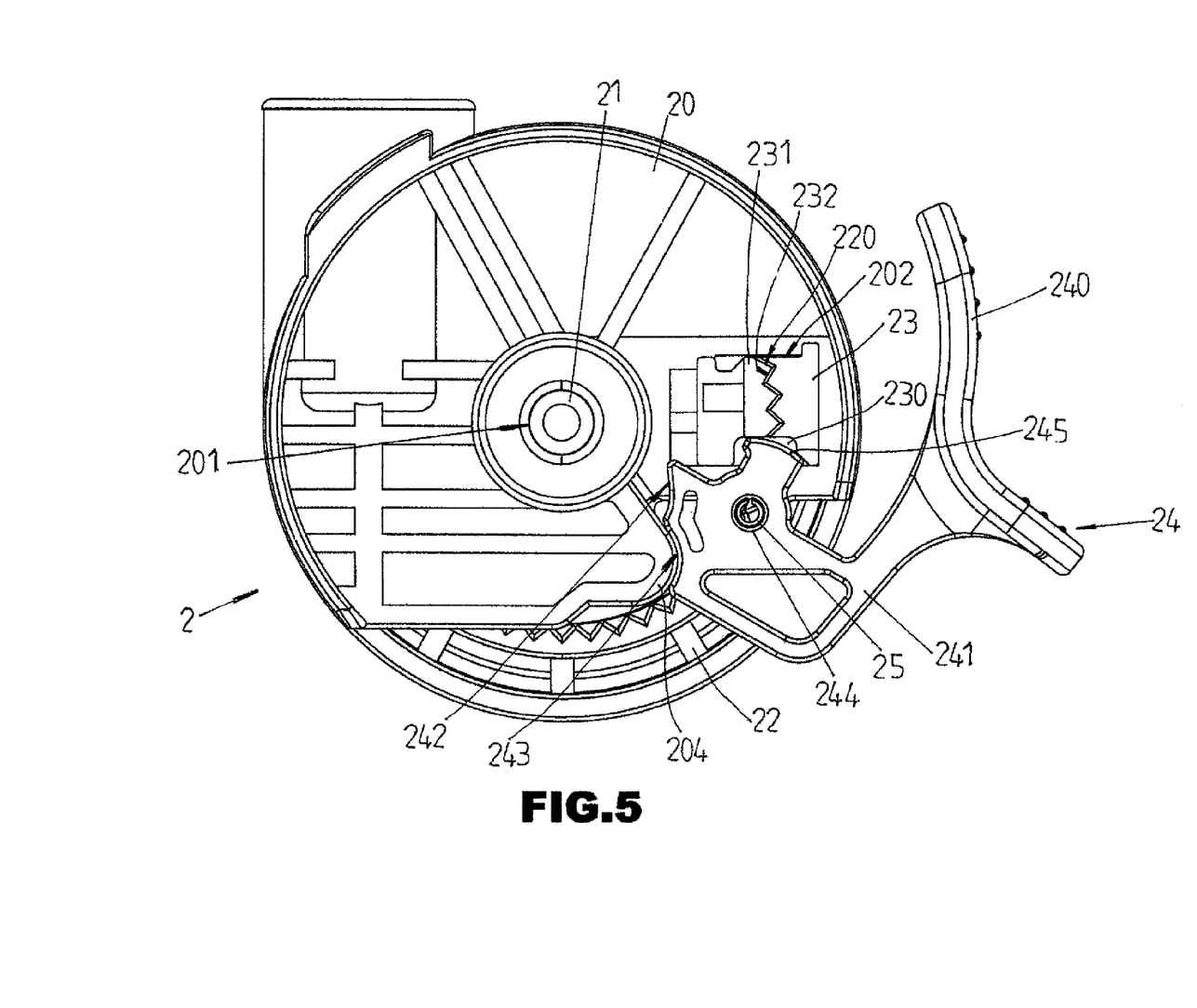
FIG. 5 is a schematic operational view of the castor as shown in FIG. 3.
Figure 6:
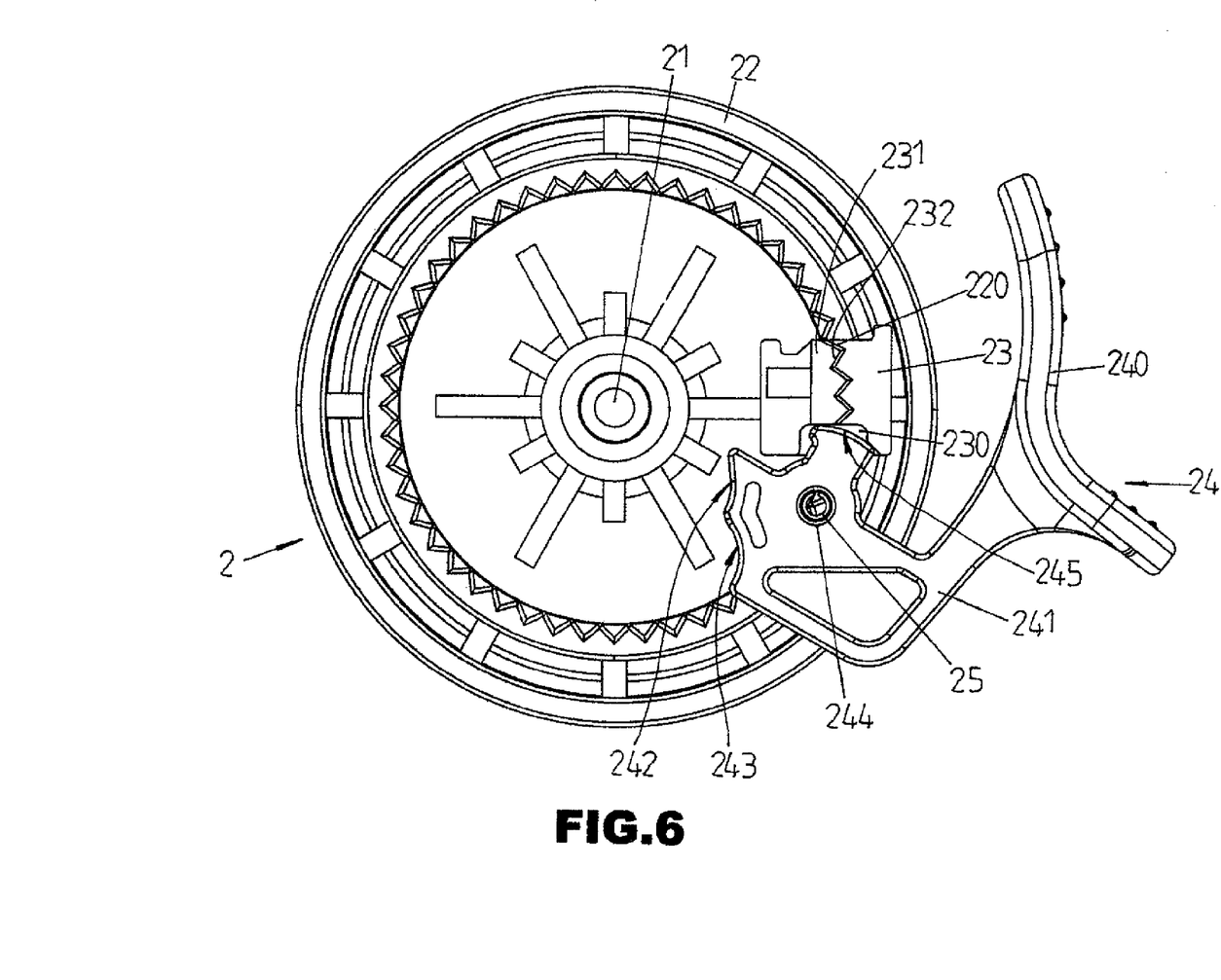
FIG. 6 is a schematic operational view of the castor as shown in FIG. 4.

When a user wishes to lock the castor 2, the press portion 240 of the brake handle 24 is pressed downward to drive the pivot base 241 of the brake handle 24 to pivot about the pivot pin 25 relative to the castor body 20 until the second resting face 243 of the pivot base 241 is movable to abut the support rib 204 of the castor body 20. In such a manner, when the second resting face 243 of the pivot base 241 is movable to abut the support rib 204 of the castor body 20 as shown in FIG. 5, the toothed engaging portion 232 of each of the two locking flanges 231 of the locking member 23 is movable to engage the toothed locking section 220 of the respective roller 22 as shown in FIG. 6, so that each of the two rollers 22 is locked onto the castor body 20, thereby locking the castor 2.

Accordingly, when the press portion 240 of the brake handle 24 is pressed to stop rotation of the two rollers 22 and to brake the castor 2, the second resting face 243 of the pivot base 241 abuts the support rib 204 of the castor body 20 so that the brake handle 24 is operated smoothly, exactly and stably without producing vibration during operation of the brake handle 24, thereby enhancing the braking effect of the castor 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor, comprising:

a castor body;

two rollers rotatably mounted on two opposite sides of the castor body and each having an inner wall provided with an annular toothed locking section;

a locking member movably mounted on the castor body and having a first end provided with two opposite locking flanges each having a toothed engaging portion facing the toothed locking section of a respective one of the two rollers;

a brake handle pivotally mounted on the castor body and connected with the locking member to drive the toothed engaging portion of each of the two locking flanges of the locking member to engage the toothed locking section of the respective roller;

wherein the brake handle has a first side provided with a pivot base pivotally mounted on the castor body and a second side provided with a press portion to drive the pivot base to pivot relative to the castor body;

the pivot base of the brake handle has two opposite sidewalls each having a first end provided with a drive portion abutting a second end of the locking member to drive and move the locking member relative to the two rollers and to drive and move the toothed engaging portion of each of the two locking flanges of the locking member relative to the toothed locking section of the respective roller;

the second end of the locking member has a bottom provided with a limit groove to receive and limit the drive portion of the brake handle so that the drive portion of the brake handle is movable and rotatable in the limit groove of the locking member to drive and move the locking member.

2. A castor, comprising:

a castor body;

two rollers rotatably mounted on two opposite sides of the castor body and each having an inner wall provided with an annular toothed locking section;

a locking member movably mounted on the castor body and having a first end provided with two opposite locking flanges each having a toothed engaging portion facing the toothed locking section of a respective one of the two rollers;

a brake handle pivotally mounted on the castor body and connected with the locking member to drive the toothed engaging portion of each of the two locking flanges of the locking member to engage the toothed locking section of the respective roller;

wherein the brake handle has a first side provided with a pivot base pivotally mounted on the castor body and a second side provided with a press portion to drive the pivot base to pivot relative to the castor body;

the pivot base of the brake handle has two opposite sidewalls each having a first end provided with a drive portion abutting a second end of the locking member to drive and move the locking member relative to the two rollers and to drive and move the toothed engaging portion of each of the two locking flanges of the locking member relative to the toothed locking section of the respective roller;

the castor body has a bottom provided with a protruding support rib;

each of the two opposite sidewalls of the pivot base of the brake handle has a second end provided with a first resting face and a second resting face;

the first resting face of the pivot base is movable to abut the support rib of the castor body when the toothed engaging portion of each of the two locking flanges of the locking member is disengaged from the toothed locking section of the respective roller, so that each of the two rollers is rotatable relative to the castor body;

the second resting face of the pivot base is movable to abut the support rib of the castor body when the toothed engaging portion of each of the two locking flanges of the locking member engages the toothed locking section of the respective roller, so that each of the two rollers is locked onto the castor body;

the castor body has an end provided with a receiving hole to receive the locking member;

the castor body is provided with a pin hole;

each of the two opposite sidewalls of the pivot base of the brake handle has a mediate portion provided with a pivot hole;

the castor further comprises a pivot pin extending through the pivot hole of the pivot base and the pin hole of the castor body so that the pivot base of the brake handle is pivotally mounted on the castor body.

3. The castor in accordance with claim 2, wherein the pin hole of the castor body is located between the receiving hole and the support rib.

4. The castor in accordance with claim 2, wherein the pivot hole of the pivot base is located between the drive portion, the first resting face and the second resting face.

5. The castor in accordance with claim 2, wherein the first resting face of the pivot base is located between the second resting face and the drive portion.

6. The castor in accordance with claim 2, wherein the second resting face of the pivot base is located beside and connected to the first resting face.

7. The castor in accordance with claim 2, wherein the two locking flanges of the locking member protrudes outwardly from two opposite sides of the receiving hole of the castor body and extend into the inner wall of each of the two rollers respectively.

8. The castor in accordance with claim 2, wherein the support rib of the castor body has a substantially arcuate shape.

9. The castor in accordance with claim 2, wherein the first resting face of the pivot base has a substantially arcuate shape.

10. The castor in accordance with claim 2, wherein the second resting face of the pivot base has a substantially arcuate shape.

11. The castor in accordance with claim 1, wherein the pivot base of the brake handle has a substantially U-shaped cross-sectional profile.

* * * * *